United States Patent
Zeng et al.

(10) Patent No.: US 11,423,112 B2
(45) Date of Patent: Aug. 23, 2022

(54) DOCUMENT INPUT CONTENT PROCESSING METHOD AND APPARATUS, ELECTRONIC DEVICE, AND STORAGE MEDIUM

(71) Applicant: Beijing Bytedance Network Technology Co., Ltd., Beijing (CN)

(72) Inventors: Qing Zeng, Beijing (CN); Pengcheng Cai, Beijing (CN); Tianxu Chen, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/398,438

(22) Filed: Aug. 10, 2021

(65) Prior Publication Data

US 2021/0365518 A1    Nov. 25, 2021

Related U.S. Application Data

(63) Continuation of application No. PCT/CN2020/082133, filed on Mar. 30, 2020.

(30) Foreign Application Priority Data

Apr. 2, 2019  (CN) .......................... 201910263593.3

(51) Int. Cl.
  *G06F 16/955* (2019.01)
  *G06F 16/958* (2019.01)
(52) U.S. Cl.
  CPC ........ *G06F 16/9558* (2019.01); *G06F 16/958* (2019.01); *G06F 16/9566* (2019.01)
(58) Field of Classification Search
  CPC . G06F 16/9558; G06F 16/9566; G06F 16/958
  See application file for complete search history.

(56) References Cited

U.S. PATENT DOCUMENTS 5,802,299 A  *  9/1998  Logan ................. G06F 16/9577
                                                  709/218
5,873,077 A  *  2/1999  Kanoh ..................... H04L 67/02
(Continued)

FOREIGN PATENT DOCUMENTS

CN         102779117 A      11/2012
CN         106095411 A      11/2016
(Continued)

OTHER PUBLICATIONS

International Patent Application No. PCT/CN2020/082133, International Search Report dated Jun. 30, 2020, 6 pages with English Translation.

(Continued)

*Primary Examiner* — Hassan Mrabi
(74) *Attorney, Agent, or Firm* — Faegre Drinker Biddle & Reath LLP

(57) ABSTRACT

The present disclosure provides a document input content processing method and apparatus, an electronic device, and a storage medium. The method includes: (101) receiving current input content in a document region on an online document page; (102) displaying, in response to identifying that the current input content is a link address, a selection box on the online document page; and (104) in response to determining that a display mode selected by a user from the selection box is a non-link display mode, obtaining, based on the non-link display mode selected by the user, corresponding content from a page of the link address, and displaying the corresponding content of the page linked with the link address in the document region.

14 Claims, 7 Drawing Sheets

(56) References Cited

U.S. PATENT DOCUMENTS

| | | | | |
|---|---|---|---|---|
| 6,028,600 A * | 2/2000 | Rosin | H04N 21/4755 | 715/718 |
| 6,072,483 A * | 6/2000 | Rosin | H04N 7/147 | 715/716 |
| 6,195,692 B1 * | 2/2001 | Hsu | H04N 7/17318 | 725/110 |
| 6,243,741 B1 * | 6/2001 | Utsumi | G06F 3/0219 | 709/208 |
| 6,260,192 B1 * | 7/2001 | Rosin | H04N 21/4821 | 725/39 |
| 6,317,778 B1 * | 11/2001 | Dias | H04L 67/1095 | 709/214 |
| 6,334,145 B1 * | 12/2001 | Adams | G06F 16/9562 | 709/217 |
| 6,397,387 B1 * | 5/2002 | Rosin | H04N 21/44222 | 725/44 |
| 6,490,615 B1 * | 12/2002 | Dias | H04L 67/1008 | 709/203 |
| 6,820,236 B1 * | 11/2004 | Bates | G06F 16/958 | 715/236 |
| 7,317,549 B2 * | 1/2008 | Naito | G06F 3/1204 | 358/1.14 |
| 8,286,078 B2 * | 10/2012 | Yi | G06F 3/0488 | 715/273 |
| 8,543,668 B1 * | 9/2013 | Long | G06F 40/134 | 709/219 |
| 9,576,069 B1 * | 2/2017 | Krecichwost | G06F 16/986 | |
| 9,747,382 B1 * | 8/2017 | Warman | G06F 16/907 | |
| 9,846,686 B2 * | 12/2017 | Scoda | G06F 16/9577 | |
| 10,909,761 B1 * | 2/2021 | Reid | G06T 19/006 | |
| 10,976,901 B1 * | 4/2021 | Sukumaran | G06F 3/04842 | |
| 2001/0047397 A1 * | 11/2001 | Jameson | G06F 16/9577 | 709/217 |
| 2002/0035619 A1 * | 3/2002 | Dougherty | H04L 67/2804 | 709/219 |
| 2002/0049882 A1 * | 4/2002 | Maslov | G06F 16/9027 | 711/1 |
| 2002/0078467 A1 * | 6/2002 | Rosin | H04N 21/8586 | 725/110 |
| 2002/0091738 A1 * | 7/2002 | Rohrabaugh | G06F 9/451 | 715/249 |
| 2002/0133626 A1 * | 9/2002 | Turnbull | G06F 16/9577 | 709/246 |
| 2002/0143936 A1 * | 10/2002 | Yu | H04L 67/14 | 709/224 |
| 2003/0078840 A1 * | 4/2003 | Strunk | G09F 27/00 | 705/14.52 |
| 2003/0115167 A1 * | 6/2003 | Sharif | G06F 3/0489 | |
| 2003/0208570 A1 * | 11/2003 | Lapidous | H04L 67/2814 | 709/222 |
| 2004/0122848 A1 * | 6/2004 | Toivonen | G06F 16/958 | |
| 2004/0169685 A1 * | 9/2004 | Kubala | G06F 16/972 | 715/809 |
| 2004/0267687 A1 * | 12/2004 | Aschen | G06F 16/958 | |
| 2005/0144251 A1 * | 6/2005 | Slate | H04M 1/72406 | 709/215 |
| 2006/0022048 A1 * | 2/2006 | Johnson | H04L 67/04 | 235/462.1 |
| 2006/0123042 A1 * | 6/2006 | Xie | G06F 16/9577 | |
| 2007/0061412 A1 * | 3/2007 | Karidi | G06Q 30/02 | 709/217 |
| 2008/0016518 A1 * | 1/2008 | Yokoyama | H04N 1/00811 | 719/321 |
| 2008/0040653 A1 * | 2/2008 | Levine | G06Q 30/02 | 715/205 |
| 2008/0065679 A1 * | 3/2008 | Fish | G06F 16/9577 | |
| 2008/0201118 A1 * | 8/2008 | Luo | G06F 40/143 | 703/2 |
| 2008/0288454 A1 * | 11/2008 | Swadi | G06F 16/24575 | |
| 2009/0089372 A1 * | 4/2009 | Sacco | G06F 16/958 | 709/204 |
| 2009/0287693 A1 * | 11/2009 | Audet | G06F 3/04815 | |
| 2010/0153544 A1 * | 6/2010 | Krassner | G06F 16/9577 | 709/224 |
| 2010/0153836 A1 * | 6/2010 | Krassner | H04L 67/36 | 715/234 |
| 2010/0281351 A1 * | 11/2010 | Mohammed | G06F 3/1204 | 715/205 |
| 2011/0099495 A1 * | 4/2011 | Harrington | H04N 1/00464 | 715/765 |
| 2011/0202827 A1 * | 8/2011 | Freishtat | G06F 16/958 | 715/234 |
| 2011/0202848 A1 * | 8/2011 | Ismalon | G06F 40/143 | 715/738 |
| 2011/0307580 A1 * | 12/2011 | Fullett | G06F 16/958 | 709/219 |
| 2012/0066216 A1 * | 3/2012 | Alexander | G06F 16/9566 | 707/723 |
| 2012/0173607 A1 * | 7/2012 | Connan | H04L 67/42 | 709/203 |
| 2012/0221449 A1 * | 8/2012 | Kief | G06F 16/958 | 705/34 |
| 2012/0246553 A1 * | 9/2012 | Ong | G06F 21/606 | 715/234 |
| 2013/0002647 A1 | 1/2013 | Bacus et al. | | |
| 2013/0014190 A1 * | 1/2013 | Sansom | H04N 21/4821 | 725/109 |
| 2013/0198636 A1 * | 8/2013 | Kief | G06F 3/04847 | 715/730 |
| 2013/0304729 A1 * | 11/2013 | Jiang | G06F 16/9558 | 707/723 |
| 2013/0304845 A1 * | 11/2013 | Sanjeev | G06F 16/9566 | 709/217 |
| 2014/0095964 A1 * | 4/2014 | Mayblum | G06F 16/958 | 715/201 |
| 2014/0189479 A1 * | 7/2014 | Glennon | G06F 16/958 | 715/205 |
| 2014/0317482 A1 * | 10/2014 | Sun | G06F 40/134 | 715/205 |
| 2015/0161084 A1 * | 6/2015 | Long | G06F 16/951 | 715/205 |
| 2015/0254335 A1 * | 9/2015 | Tsu | G06F 40/169 | 707/740 |
| 2016/0019195 A1 * | 1/2016 | Sultan | G06F 16/958 | 715/202 |
| 2016/0179834 A1 * | 6/2016 | Takei | G06F 16/248 | 707/722 |
| 2017/0034115 A1 * | 2/2017 | Huang | G06F 16/9566 | |
| 2017/0052969 A1 | 2/2017 | Carriero et al. | | |
| 2017/0169856 A1 * | 6/2017 | Wang | G06F 16/9566 | |
| 2017/0192941 A1 * | 7/2017 | Glover | H04L 67/2804 | |
| 2017/0308344 A1 * | 10/2017 | Furihata | G06F 3/147 | |
| 2018/0046637 A1 * | 2/2018 | Koopman | G06F 16/958 | |
| 2018/0373803 A1 * | 12/2018 | Shultz | G06F 16/9577 | |
| 2020/0012695 A1 * | 1/2020 | Esquivel | H04L 67/02 | |
| 2020/0019601 A1 * | 1/2020 | Tsu | G06F 40/169 | |
| 2020/0019602 A1 * | 1/2020 | Tsu | G06F 16/382 | |
| 2020/0401645 A1 * | 12/2020 | Brown | G06F 40/134 | |

FOREIGN PATENT DOCUMENTS

| | | |
|---|---|---|
| CN | 107491560 A | 12/2017 |
| CN | 108255923 A | 7/2018 |
| CN | 109299244 A | 2/2019 |
| CN | 109492210 A | 3/2019 |
| CN | 110046309 A | 7/2019 |
| WO | 2015/143875 A1 | 10/2015 |

OTHER PUBLICATIONS

Chinese Patent Application No. 201910263593.3, First Office Action and Search Report dated Nov. 3, 2020, 18 pages with English Translation.

Chinese Patent Application No. 201910263593.3, Second Office Action dated Aug. 3, 2021, 12 pages with English Translation.

European Patent Application No. 20782369.1, Extended European Search Report dated Jan. 14, 2022, 4 pages.

(56) References Cited

OTHER PUBLICATIONS

Cloudhq (2018) "Gmail URL Link Preview" [online] Accessed on: Jan. 5, 2022, website: https://www.youtube.com/watch?v=pGRngYMwjxo, XP055876463.
Chinese Patent Application No. 201910263593.3, Third Office Action dated Dec. 24, 2021, 19 pages with English translation.

* cited by examiner

DOCUMENT INPUT CONTENT PROCESSING METHOD AND APPARATUS, ELECTRONIC DEVICE, AND STORAGE MEDIUM

CROSS-REFERENCE TO RELATED APPLICATION

The present application is a continuation of International Application No. PCT/CN2020/082133, filed on Mar. 30, 2020, which claims a priority to Chinese Patent Application No. 201910263593.3, titled "DOCUMENT INPUT CONTENT PROCESSING METHOD AND APPARATUS, ELECTRONIC DEVICE, AND STORAGE MEDIUM", and filed by Beijing ByteDance Technology Co., Ltd., on Apr. 2, 2019, which are hereby incorporated by reference in their entireties.

TECHNICAL FIELD

The present disclosure relates to the field of computer technologies, and more particularly, to a document input content processing method and apparatus, an electronic device, and a storage medium.

BACKGROUND

With the development of Internet technologies, the number of applications supported by the Internet is becoming increasingly larger, and online documents are an important form of Internet applications. Online documents are an extension of traditional desktop word processing applications in Internet applications. Online document technology has gradually eliminated users' dependence on processing software.

Currently, in a process of editing an online document, a user can paste some content on an online document page through copy and paste functions according to his/her needs. For example, when the user pastes an address through the paste function, a link address will be directly pasted to a corresponding target position of the online document.

However, when the user needs to view related content, for example, a title or content, of the link address, the user needs to trigger the link address of the online document and open a page corresponding to the link address to view content that needs to be viewed. Consequently, it can be seen that there are many operation steps for the user to learn about the related content of the page corresponding to the link address on the online document page, and use experience of the online document for the user is not ideal.

SUMMARY

The present disclosure provides a document input content processing method and apparatus, an electronic device, and a storage medium, capable of enabling a user to view related link content of a link address on an online document page without clicking on the link address on the online document page, reducing operation steps of viewing link content by the user, facilitating intuitively knowing the link content by a document user, and improving user experience.

According to an embodiment in a first aspect of the present disclosure, a document input content processing method is provided. The method includes: receiving current input content in a document region on an online document page; displaying, in response to identifying that the current input content is a link address, a selection box on the online document page, the selection box including at least one non-link display mode; obtaining a target display mode selected by a user from the at least one non-link display mode; and obtaining, based on the target display mode, corresponding page content from a page corresponding to the link address, and displaying the corresponding page content in the document region.

In an embodiment of the present disclosure, the method further includes, prior to said displaying the selection box on the online document page, determining whether a network protocol type corresponding to the link address is a predetermined network protocol type. Said displaying the selection box on the online document page is performed when it is determined that the network protocol type corresponding to the link address is the predetermined network protocol type.

In an embodiment of the present disclosure, the method further includes, prior to said displaying the selection box on the online document page, determining whether a link type of the link address is a predetermined link type. Said displaying the selection box on the online document page includes: displaying a first selection box on the online document page when it is determined that the link type of the link address is the predetermined link type, wherein the first selection box includes a number, N, of non-link display modes, where N is a positive integer greater than 1; and displaying a second selection box on the online document page when it is determined that the link type of the link address is not the predetermined link type, wherein the second selection box includes a number, M, of non-link display modes, where M is a positive integer different from N.

In an embodiment of the present disclosure, said determining whether the link type of the link address is the predetermined link type includes: obtaining a predetermined address format rule corresponding to the predetermined link type; and determining whether an address format of the link address conforms to the predetermined address format rule. It is determined that the link type of the link address is the predetermined link type when it is determined that the address format of the link address conforms to the predetermined address format rule.

In an embodiment of the present disclosure, the method further includes, prior to said displaying the selection box on the online document page: determining a link type of the link address based on the link address; and determining the at least one non-link display mode in the selection box based on the link type.

In an embodiment of the present disclosure, when the target display mode is a title display mode, said obtaining, based on the target display mode, the corresponding page content from the page corresponding to the link address, and displaying the corresponding page content in the document region include: obtaining, based on the title display mode, title information from the page corresponding to the link address, and displaying the title information in the document region.

In an embodiment of the present disclosure, when the target display mode is a web page display mode, said obtaining, based on the target display mode, the corresponding page content from the page corresponding to the link address, and displaying the corresponding page content in the document region includes: obtaining, based on the web page display mode, all page content from the page corresponding to the link address; and creating a window in the document region, and displaying a part of all the page content in the created window.

According to an embodiment in a first aspect of the present disclosure, a document input content processing apparatus is provided. The apparatus includes: a receiving module configured to receive current input content in a document region on an online document page; a display module configured to display, in response to identifying that the current input content is a link address, a selection box on the online document page, the selection box including at least one non-link display mode; an obtaining module configured to obtain a target display mode selected by a user from the at least one non-link display mode; and a processing module configured to obtain, based on the target display mode, corresponding page content from a page corresponding to the link address, and display the corresponding page content in the document region.

According to an embodiment of the present disclosure, the apparatus further includes a first determining module configured to determine whether a network protocol type corresponding to the link address is a predetermined network protocol type. The display module is specifically configured to display the selection box on the online document page when it is determined that the network protocol type corresponding to the link address is the predetermined network protocol type.

According to an embodiment of the present disclosure, the apparatus further includes a second determining module configured to determine whether a link type of the link address is a predetermined link type. The display module is specifically configured to: display a first selection box on the online document page when it is determined that the link type of the link address is the predetermined link type, wherein the first selection box includes a number, N, of non-link display modes, where N is a positive integer greater than 1; and display a second selection box on the online document page when it is determined that the link type of the link address is not the predetermined link type, wherein the second selection box includes a number, M, of non-link display modes, where M is a positive integer different from N.

According to an embodiment of the present disclosure, the second determining module is specifically configured to determine whether an address format of the link address conforms to the predetermined address format rule. It is determined that the link type of the link address is the predetermined link type when it is determined that the address format of the link address conforms to the predetermined address format rule.

According to an embodiment of the present disclosure, the apparatus further includes: a first determination module configured to determine a link type of the link address based on the link address; and a second determination module configured to determine the at least one non-link display mode in the selection box based on the link type.

According to an embodiment of the present disclosure, when the target display mode is a title display mode, the processing module is specifically configured to obtain, based on the title display mode, title information from the page corresponding to the link address, and display the title information in the document region.

According to an embodiment of the present disclosure, when the target display mode is a web page display mode, the processing module is specifically configured to: obtain, based on the web page display mode, all page content from the page corresponding to the link address; and create a window in the document region, and display a part of all the page content in the created window.

With the document input content processing apparatus according to the embodiments of the present disclosure, current input content is received in a document region on an online document page. In response to determining that the current input content is a link address, a selection box is displayed on the online document page. In response to determining that a display mode selected by a user from the selection box is a non-link display mode, corresponding content is obtained, based on the non-link display mode selected by the user, from a page of the link address. The corresponding content of the page linked with the link address is displayed in the document region. Therefore, the user can view related link content of the link address on the online document page without clicking on the link address on the online document page, thereby reducing operation steps of viewing the link content by the user, facilitating intuitively knowing the link content by a document user, and improving user experience.

To achieve the above objects, according to an embodiment in a third aspect of the present disclosure, an electronic device is provided. The electronic device includes a memory, a processor, and a computer program stored in the memory and executable by the processor. The processor executes the program so as to: receiving current input content in a document region on an online document page; displaying, in response to identifying that the current input content is a link address, a selection box on the online document page, the selection box including at least one non-link display mode; obtain a target display mode selected by a user from the at least one non-link display mode; and obtain, based on the target display mode, corresponding page content from a page corresponding to the link address, and display the corresponding page content in the document region.

To achieve the above objects, according to an embodiment in a fourth aspect of the present disclosure, a non-transitory computer-readable storage medium is provided. The non-transitory computer-readable storage medium stores a computer program which is executed by a processor so as to: receive current input content in a document region on an online document page; display, in response to identifying that the current input content is a link address, a selection box on the online document page, the selection box including at least one non-link display mode; obtain a target display mode selected by a user from the at least one non-link display mode; and obtain, based on the target display mode, corresponding page content from a page corresponding to the link address, and display the corresponding page content in the document region.

Additional aspects and advantages of the present disclosure will be given at least in part in the following description, or become apparent at least in part from the following description, or can be learned from practicing of the present disclosure.

BRIEF DESCRIPTION OF DRAWINGS

The above and/or additional aspects and advantages of the present disclosure will become more apparent and more understandable from the following description of embodiments taken in conjunction with the accompanying drawings, in which.

DESCRIPTION OF EMBODIMENTS

Figure 1:
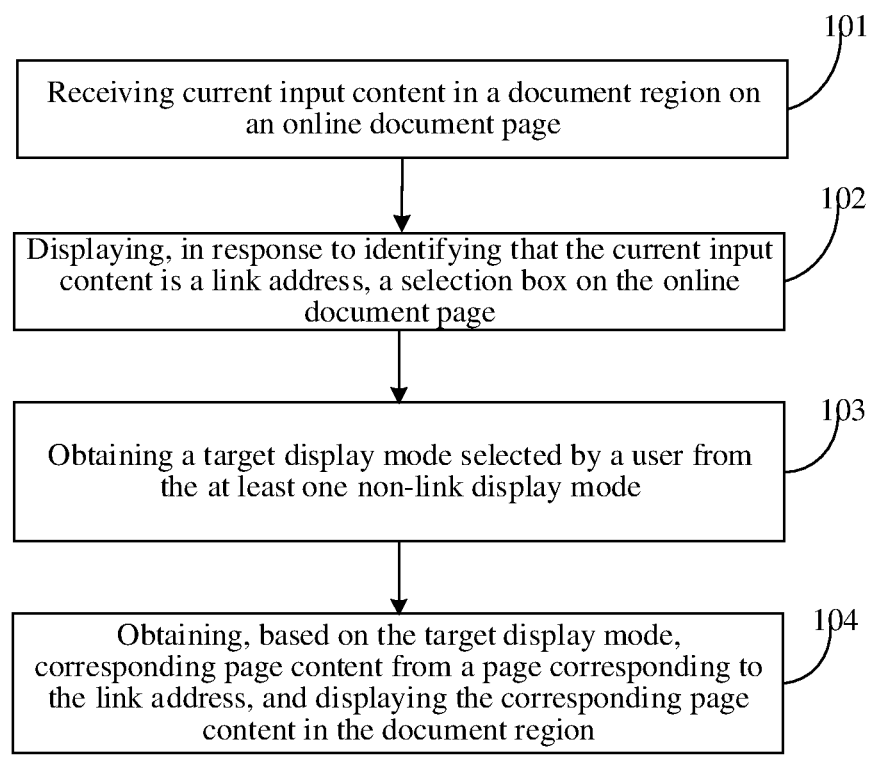
FIG. 1 is a flowchart illustrating a document input content processing method according to an embodiment of the present disclosure.

The embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain, rather than limiting, the present disclosure.

A document input content processing method and apparatus, an electronic device, and a storage medium according to the embodiments of the present disclosure will be described below with reference to the figures.

In the related art, when a user inputs a content address into a document on an online document page, a link address on the online document page is not processed, but a form of link is retained. So it is difficult for the user to intuitively understand link content without clicking on the link address on the online document page.

To this end, the present disclosure provides a document input content processing method. In the document input content processing method, current input content is received in a document region on an online document page. In response to determining that the current input content is a link address, a selection box is displayed on the online document page. In response to determining that a display mode selected by a user from the selection box is a non-link display mode, corresponding content is obtained, based on the non-link display mode selected by the user, from a page of the link address. The corresponding content of the page linked with the link address is displayed in the document region. Therefore, the user can view related link content of the link address on the online document page without clicking on the link address on the online document page, thereby reducing operation steps of viewing the link content by the user, facilitating intuitively knowing the link content by a document user, and improving user experience.

FIG. 1 is a flowchart illustrating a document input content processing method according to an embodiment of the present disclosure.

As illustrated in FIG. 1, the document input content processing method includes the following steps.

At block 101, current input content is received in a document region on an online document page.

The current input content may be inputted by the user through pasting, or may be inputted by the user through the input method, and this embodiment is not limited to any of these examples.

It should be understood that the document input content processing method according to the embodiments of the present disclosure is performed by a document input content processing apparatus. The document input content processing apparatus may be set in software having an online document function. For example, the document input content processing apparatus may be set in an application that only has the online document function, or may also be set in an application that has other functions (such as an instant messaging function) in addition to the online document function.

The application can be set in the electronic device or a server, and this embodiment is not limited to any of these examples.

In an embodiment of the present disclosure, description is made by taking an example that an application having the online document function is installed in an electronic device.

The electronic device may include, but is not limited to, a mobile phone, a tablet computer, a wearable device, etc., and this embodiment is not limited to any of these examples.

At block 102, in response to identifying that the current input content is a link address, a selection box is displayed on the online document page.

The selection box may be displayed on the online document page in many ways. For example, the selection box may be displayed on a predetermined region on the online document page, or the selection box may be displayed on a region where the cursor is located in the document region.

The selection box includes at least one non-link display mode.

The non-link display mode refers to display modes other than a link display mode (that is, the link address is inserted in a form of a link).

The non-link display mode may include, but is not limited to, a title display mode, a web page display mode, and the like. For example, the non-link display mode may also include a card link display mode.

The title display mode refers to inserting a title of content linked by the link address into the online document page.

The web page display mode refers to embedding page content linked by the link address on the online document page.

The card link display mode refers to displaying related content of a page linked by the link address in the document region in a form of a display card.

The related content may be all page content or a part of all the page content. This embodiment is not limited in this regard.

It should be understood that in a process of using the online document, different users have different requirements for display modes of the link address. In order to meet the user's personalized requirement of inserting the link address only, in addition to the non-link display modes, the selection box may include the link display mode, that is, the link address is inserted in the form of a link.

As an exemplary embodiment, when it is determined that the display mode selected by the user from the selection box is the link display mode, no processing is performed on the link address pasted to the online document page. Only the link address is displayed on the online document page.

At block 103, a target display mode selected by a user from the at least one non-link display mode is obtained.

It is to be noted that, in order to reduce interference caused by the selection box when the user uses the online document, as an exemplary embodiment, the selection box is retracted when it is monitored that the user selects the target display mode from the selection box. In this way, interference to the user resulted from the selection box kept being displayed may be avoided, thereby improving use experience of the online document for the user.

At block 104, corresponding page content is obtained, based on the target display mode, from a page corresponding to the link address, and the corresponding page content is displayed in the document region.

It is to be noted that different target display modes may obtain different page content from the page corresponding to the link address.

In different application scenarios, modes of obtaining, based on the target display mode, the corresponding page content from the page corresponding to the link address, and displaying the corresponding page content in the document region are different. Exemplarily description is made below with reference to specific display modes.

As an example, when the target display mode is a title display mode, obtaining, based on the target display mode, the corresponding page content from the page corresponding to the link address, and displaying the corresponding page content in the document region may include: obtaining, based on the title display mode, title information from the page corresponding to the link address, and displaying the title information in the document region.

As an example, when the target display mode is a web page display mode, obtaining, based on the target display mode, the corresponding page content from the page corresponding to the link address, and displaying the corresponding page content in the document region may include: obtaining, based on the web page display mode, all page content from the page corresponding to the link address; and creating a window in the document region, and displaying a part of all the page content in the created window.

Specifically, according to the web page display mode, all the page content can be obtained from the page corresponding to the link address, and an embedded window can be created below the link address of the online document. All the obtained page content can be loaded into the embedded window. The part of all the page content can be displayed in the embedded window.

It is to be noted that, due to a limited display region of the embedded window, only a part of the page content of the page linked by the link address can be displayed in the embedded window. In order to enable the user to view other content of the page linked by the link address from the embedded window, as an example, a scroll bar is also provided in the embedded window. The user can view remaining content through scrolling the scroll bar.

As another example, a sliding operation of the user on the region where the embedded window is located can also be received. Corresponding page content is displayed in the embedded window based on the sliding operation. Consequently, it is convenient for the user to view all the content of the link.

With the document input content processing method according to the embodiment of the present disclosure, current input content is received in a document region on an online document page. In response to determining that the current input content is a link address, a selection box is displayed on the online document page. In response to determining that a display mode selected by a user from the selection box is a non-link display mode, corresponding content is obtained from a page of the link address, based on the non-link display mode selected by the user. The corresponding content of the page linked with the link address is displayed in the document region. Therefore, the user can view related link content of the link address on the online document page without clicking on the link address on the online document page, thereby reducing operation steps of viewing the link content by the user, facilitating intuitively knowing the link content by a document user, and improving user experience.

An embodiment of the present disclosure provides another document input content processing method, which is an extension and optimization of the method illustrated in FIG. 1.

Figure 2:
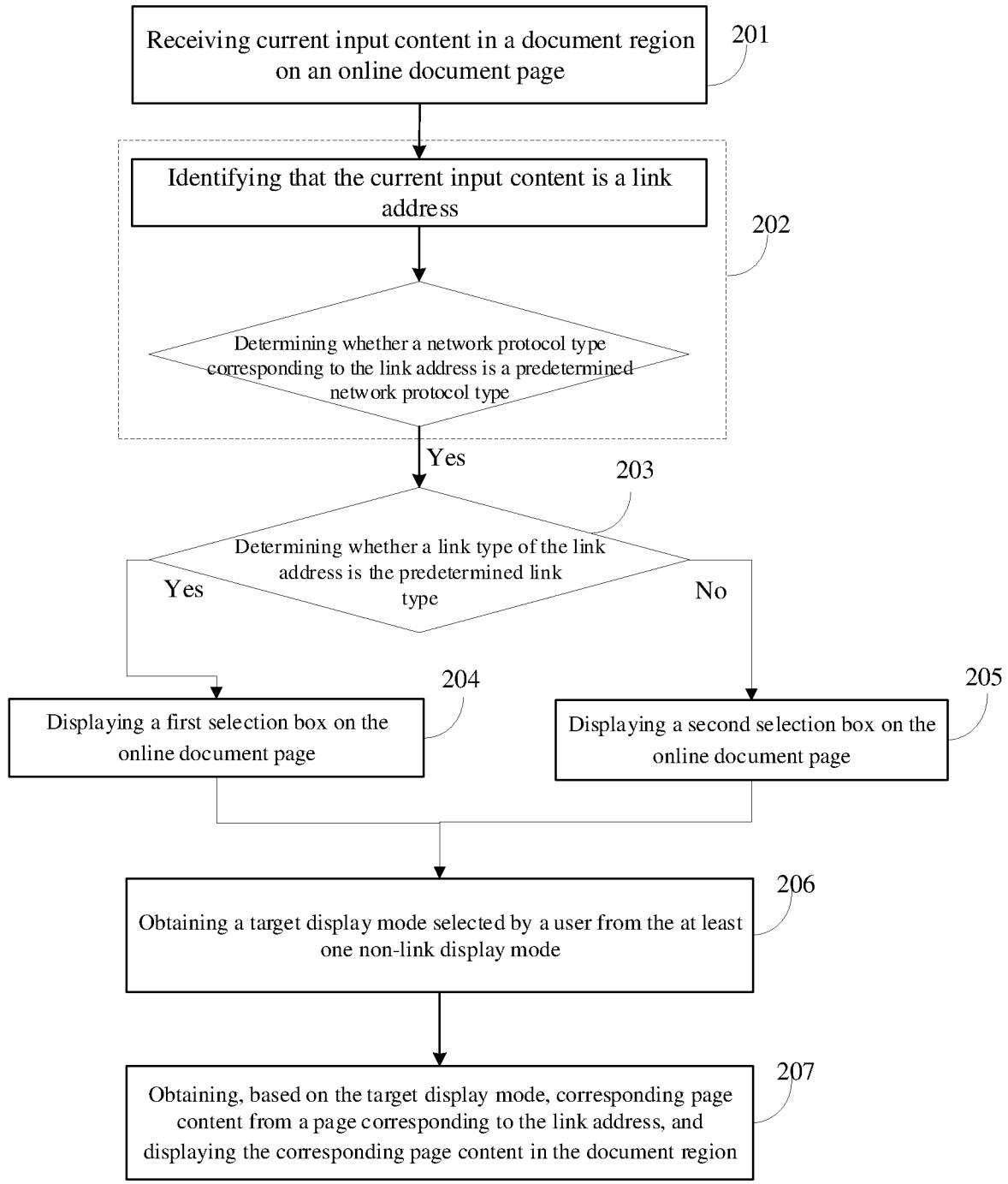
FIG. 2 is a flowchart illustrating another document input content processing method according to an embodiment of the present disclosure.

FIG. 2 is a flowchart illustrating another document input content processing method according to an embodiment of the present disclosure.

As illustrated in FIG. 2, the document input content processing method includes the following steps.

At block 201, current input content is received in a document region on an online document page.

At block 202, in response to identifying that the current input content is a link address, it is determined whether a network protocol type corresponding to the link address is a predetermined network protocol type. If yes, step 203 is executed.

It should be understood that different link addresses correspond to different network protocol types.

The network protocol types may include, but are not limited to, Hypertext Transfer Protocol Version (HTTP), Secure Hypertext Transfer Protocol (HTTPS), File Transfer Protocol (FTP), etc.

In order to prompt a display mode conforming to the predetermined network protocol type in a targeted manner, prior to displaying the selection box on the online document page in a pop-up window manner according to an embodiment, it is determined whether the network protocol type of the link address conforms to the predetermined network protocol type.

The predetermined network protocol type may be, for example, HTTPS.

As an exemplary embodiment, a network protocol type corresponding to the link address can be determined by analyzing the link address.

For example, if the link address pasted into the online document is https://www.youtub.com, it can be determined, by analyzing prefix information of the link address, that the network protocol type of the link address is HTTPS.

It is to be noted that, when it is determined that the network protocol type corresponding to the link address is not the predetermined network protocol type, no processing will be performed on the link address pasted to the online document page, and only the link address is displayed.

At block 203, it is determined whether a link type of the link address is the predetermined link type. If yes, step 204 is executed; otherwise, step 205 is executed.

The predetermined link type refers to a link of which a link address conforms to the predetermined address format rule.

The predetermined link type may be, for example, an online document link.

The online document link refers to a link having an address format rule of https://docs.xxxx.net.

As an exemplary embodiment, determining whether the link type of the link address is the predetermined link type may include: obtaining a predetermined address format rule corresponding to the predetermined link type; and determining whether an address format of the link address conforms to the predetermined address format rule.

It is determined that the link type of the link address is the predetermined link type when it is determined that the address format of the link address conforms to the predetermined address format rule.

In addition, it is to be noted that the link type of the link address is not the predetermined link type when it is determined that the address format rule of the link address does not conform to the predetermined address format rule.

At block 204, a first selection box is displayed on the online document page.

As an exemplary embodiment, the first selection box may be popped up around a position where the link address of the online document is located.

The first selection box includes a number, N, of non-link display modes, where N is a positive integer greater than 1.

It is to be noted that, in order to meet the user's personalized requirement of inserting the link address only, the first selection box may include not only the non-link display modes, but also the link display mode.

At block 205, a second selection box is displayed on the online document page.

The second selection box includes a number, M, of non-link display modes, where M is a positive integer different from N.

As an example, M can be a positive integer smaller than N.

In an embodiment, it is determined whether the link type of the link address is the predetermined link type. The selection box including different display modes are displayed on the online document page, based on a determination result. Therefore, in combination with the link type, different display modes are displayed for the user, thereby further facilitating selecting the display mode by the user.

Figure 3:
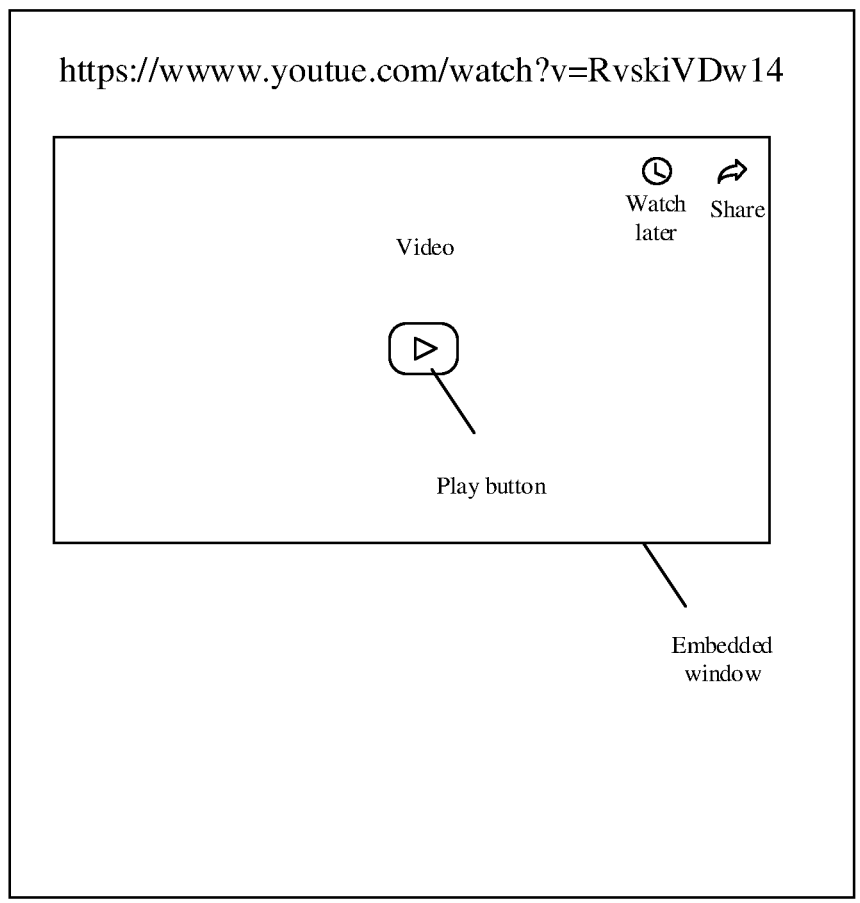
FIG. 3 is an example diagram showing displaying video information of a link address in a document region.

For example, assuming that the predetermined link type is a video link, when it is determined that the link type of the link address is a video link, a selection box including a video display mode can be displayed on the online document page. When the user selects the video display mode, only a video in a page of the link address may be obtained, and video information may be displayed in the embedded window created on the online document page. An example diagram of the video information of the link address is displayed in the document region, as illustrated in FIG. 3. It is to be noted that FIG. 3 takes an example that the video information linked by the link address is displayed in the embedded window on the online document page. In addition, it is to be noted that the user can play the video in the link address by triggering a play button.

At block 206, a target display mode selected by a user from the at least one non-link display mode is obtained.

At block 207, corresponding page content is obtained, based on the target display mode, from a page corresponding to the link address, and the corresponding page content is displayed in the document region.

With the document input content processing method according to the embodiment of the present disclosure, current input content is received in a document region on an online document page. When it is determined that the current input content is a link address, a network protocol of the link address is determined. When it is determined that a network protocol type of the link address is a predetermined network protocol type, it is further determined whether a link type of the link address is a predetermined link type. When the link type of the link address is the predetermined link type, a first selection box is displayed on the online document page. When the link type of the link address is not the predetermined link type, a second selection box is displayed on the online document page. When it is determined that a display mode selected by the user from the selection box is a non-link display mode, corresponding content is obtained from a page of the link address, based on the non-link display mode selected by the user, and corresponding content of a page linked to the link address is displayed in the document region. Therefore, the user can view related link content of the link address on the online document page without clicking on the link address on the online document page, thereby reducing operation steps of viewing the link content by the user, facilitating intuitively knowing the link content by a document user, and improving user experience.

An embodiment of the present disclosure provides another document input content processing method, which is a further extension and optimization of the method illustrated in FIG. 1.

Figure 4:
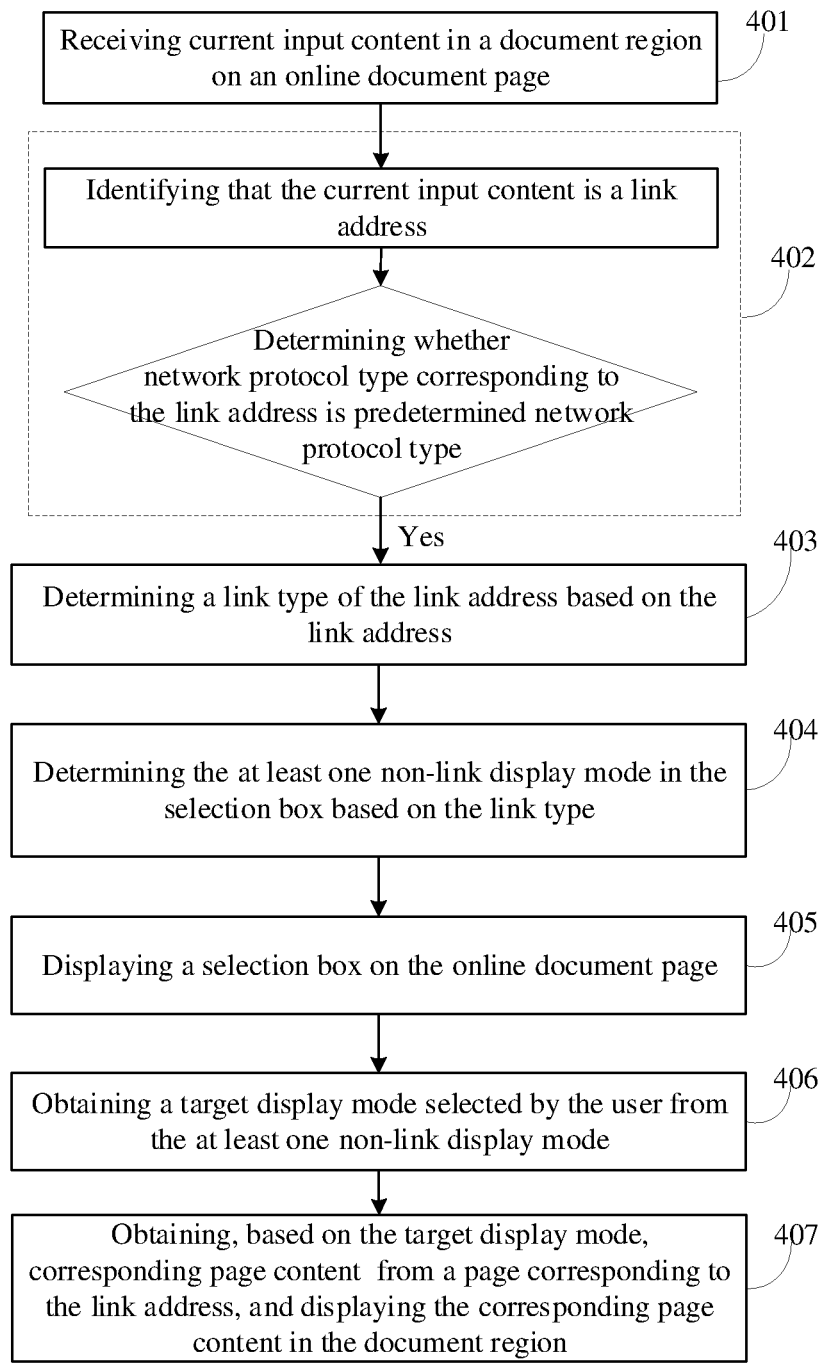
FIG. 4 is a flowchart illustrating yet another document input content processing method according to an embodiment of the present disclosure.

FIG. 4 is a flowchart illustrating yet another document input content processing method according to an embodiment of the present disclosure.

As illustrated in FIG. 4, the document input content processing method includes the following steps.

At block 401, current input content is received in a document region on an online document page.

At block 402, it is determined, in response to identifying that the current input content is a link address, whether a network protocol type corresponding to the link address is a predetermined network protocol type. If yes, step 403 is executed.

It is to be noted that step 402 is the same as step 202 in the above embodiments, and the above description of step 202 is also applicable to step 402, and thus the description thereof will be omitted here.

At block 403, a link type of the link address is determined based on the link address.

At block 404, the at least one non-link display mode in the selection box is determined based on the link type.

In other words, the non-link display mode corresponds to the link type. Different link types may correspond to different non-link display modes.

For example, when the link type of the link address is an online document link, non-link display modes in a selection box corresponding to the online document link can include the web page display mode and the title display mode. When the link type of the link address is a video link, non-link display modes in a selection box corresponding to the video link can include the web page display mode, the title display mode, and the video display mode. Consequently, it can be seen that non-link display modes in selection boxes corresponding to different link types may be different from each other.

At block 405, a selection box is displayed on the online document page.

In other words, the at least one non-link display mode in the selection box is determined by the link type of the link address.

The selection box includes the at least one non-link display mode corresponding to the link type.

In addition, it is to be noted that in addition to the at least one non-link display mode, the selection box may also include the link display mode.

At block 406, a target display mode selected by the user from the at least one non-link display mode is obtained.

At block 407, corresponding page content is obtained, based on the target display mode, from a page corresponding to the link address, and the corresponding page content is displayed in the document region.

With the document input content processing method according to the embodiment of the present disclosure, current input content is received in a document region on an online document page. When it is determined that the current input content is a link address, a network protocol of the link address is determined. When it is determined that a network protocol type of the link address is a predetermined network protocol type, a link type of the link address is determined based on the link address. The at least one non-link display mode in the selection box is determined based on the link type. The selection box including the at least one non-link display mode corresponding to the link type is displayed on the online document page. When it is determined that a display mode selected by the user from the selection box is a non-link display mode, corresponding content is obtained from a page of the link address based on the non-link display mode selected by the user. The corresponding content of the page linked by the link address is displayed in the document region. Therefore, the user can view related link content of the link address on the online document page without clicking on the link address on the online document page, thereby reducing operation steps of viewing the link content by the user, facilitating intuitively knowing the link content by a document user, and improving user experience.

Figure 5:
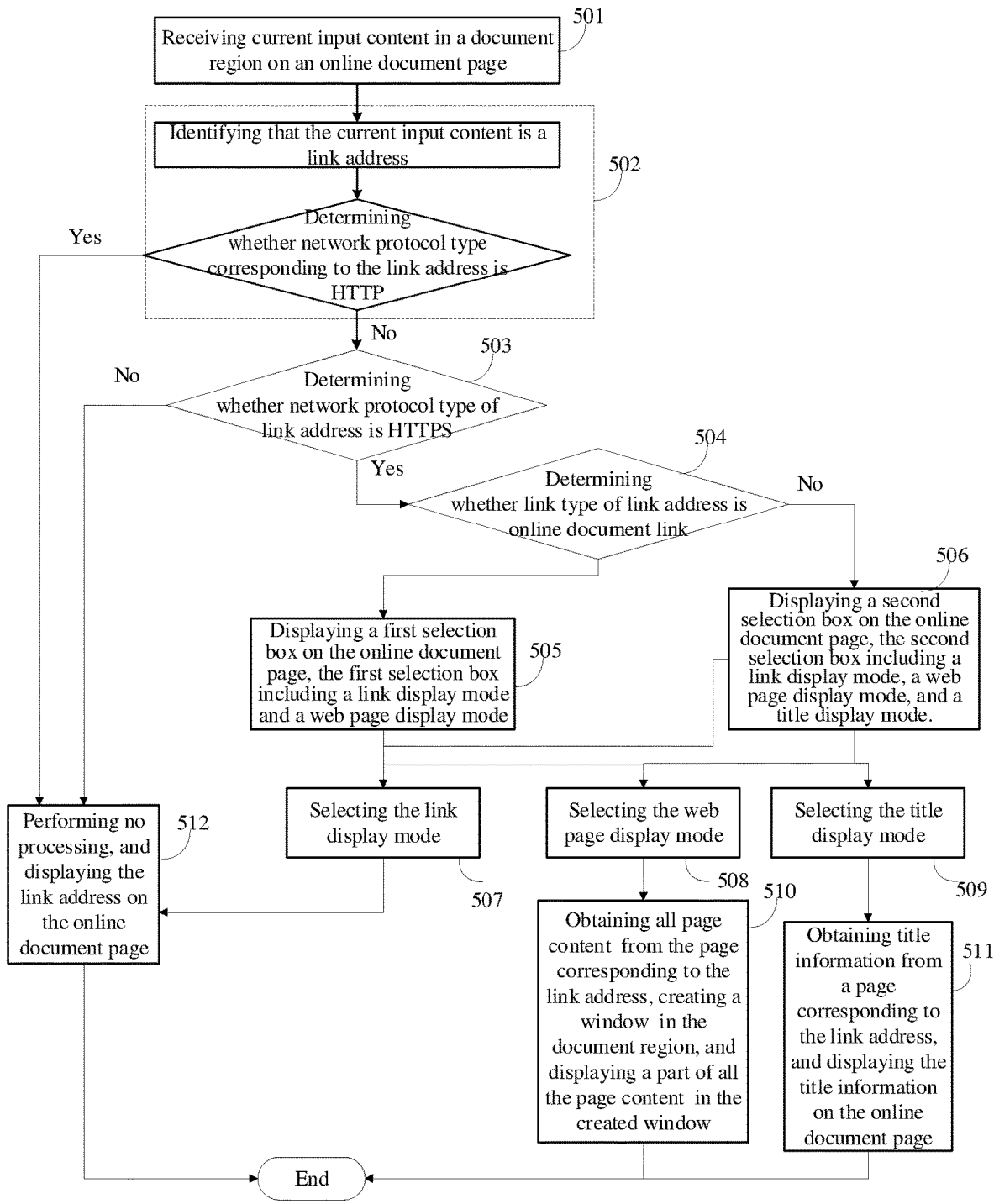
FIG. 5 is a flowchart illustrating still yet another document input content processing method according to an embodiment of the present disclosure.

FIG. 5 is a flowchart illustrating still yet another document input content processing method according to an embodiment of the present disclosure.

It is to be noted that FIG. 5 is a specific embodiment of the document input content processing method of the present disclosure. In this embodiment, description is made by taking an example that the predetermined network protocol type is HTTPS, and the predetermined link type is an online document type.

As illustrated in FIG. 5, the document input content processing method includes the following steps.

At block 501, current input content is received in a document region on an online document page.

At block 502, it is determined, in response to identifying that the current input content is a link address, whether a network protocol type corresponding to the link address is HTTP. If yes, step 512 is executed; otherwise step 503 is executed.

At block 503, it is determined whether the network protocol type of the link address is HTTPS. If yes, step 503 is executed; otherwise, step 512 is executed.

At block 504, it is determined whether the link type of the link address is an online document link. If not, step 505 is executed. If yes, step 506 is executed.

At block 505, a first selection box is displayed on the online document page. The first selection box includes a link display mode and a web page display mode.

At block 506, a second selection box is displayed on the online document page. The second selection box includes a link display mode, a web page display mode, and a title display mode.

At block 507, when it is monitored that the link display mode is selected, step 512 is executed.

Specifically, after the first selection box or the second selection box pops up in the online document, the user can select a corresponding display mode from the first selection box or the second selection box according to his/her needs.

At block 508, when it is monitored that the web page display mode is selected, step 510 is executed.

At block 509, when it is monitored that the title display mode is selected, step 511 is executed.

When the link type of the link address is an online document link, in order to facilitate knowing a document title of an online document corresponding to the link address on the online document page by the user, the user can select the title display mode to know title information of link content of the link address from the online document page.

At block 510, all page content is obtained from the page corresponding to the link address. A window is created in the document region. A part of all the page content is displayed in the created window.

In an embodiment, after the user selects the web page display mode, the page content linked by the link address is displayed in the window created by the online document, such that the user does not need to click on the link address on the online document page, and can directly browse content of another web page on the online document page.

At block 511, title information is obtained from a page corresponding to the link address, and the title information is displayed in the document region.

In an embodiment, after the user selects the title display mode, a title of the link content corresponding to the link address is displayed in the document region. Consequently, the user can directly view the title information of the link content on the online document page without clicking on the link address on the online document page, thereby facilitating intuitively knowing the title information of the content linked by the link address by the user.

It is to be noted that, the title information of the content linked by the link address is displayed while the link address is displayed in the document region.

At block 512, no processing is performed, and the link address is displayed in the document region.

To implement the above embodiments, an embodiment of the present disclosure further provides a document input content processing apparatus.

Figure 6:
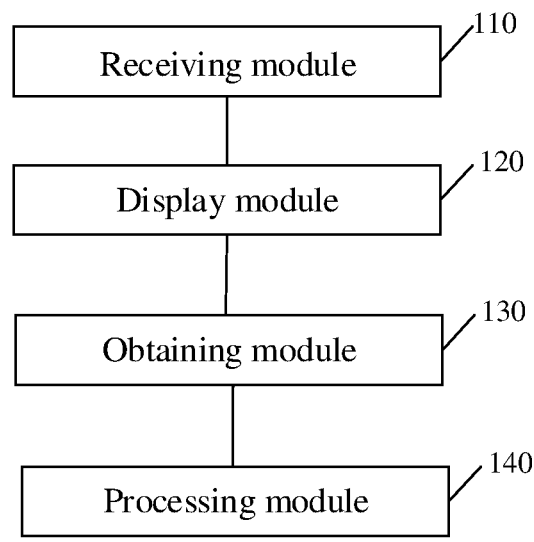
FIG. 6 is a block diagram showing a structure of a document input content processing apparatus according to an embodiment of the present disclosure.

FIG. 6 is a block diagram showing a structure of a document input content processing apparatus according to an embodiment of the present disclosure.

As illustrated in FIG. 6, the document input content processing apparatus may include a receiving module 110, a display module 120, an obtaining module 130, and a processing module 140.

The receiving module 110 is configured to receive current input content in a document region on an online document page.

The display module 120 is configured to display, in response to identifying that the current input content is a link address, a selection box on the online document page. The selection box includes at least one non-link display mode.

The obtaining module 130 is configured to obtain a target display mode selected by a user from the at least one non-link display mode.

The processing module 140 is configured to obtain, based on the target display mode, corresponding page content from a page corresponding to the link address, and display the corresponding page content in the document region.

Figure 7:
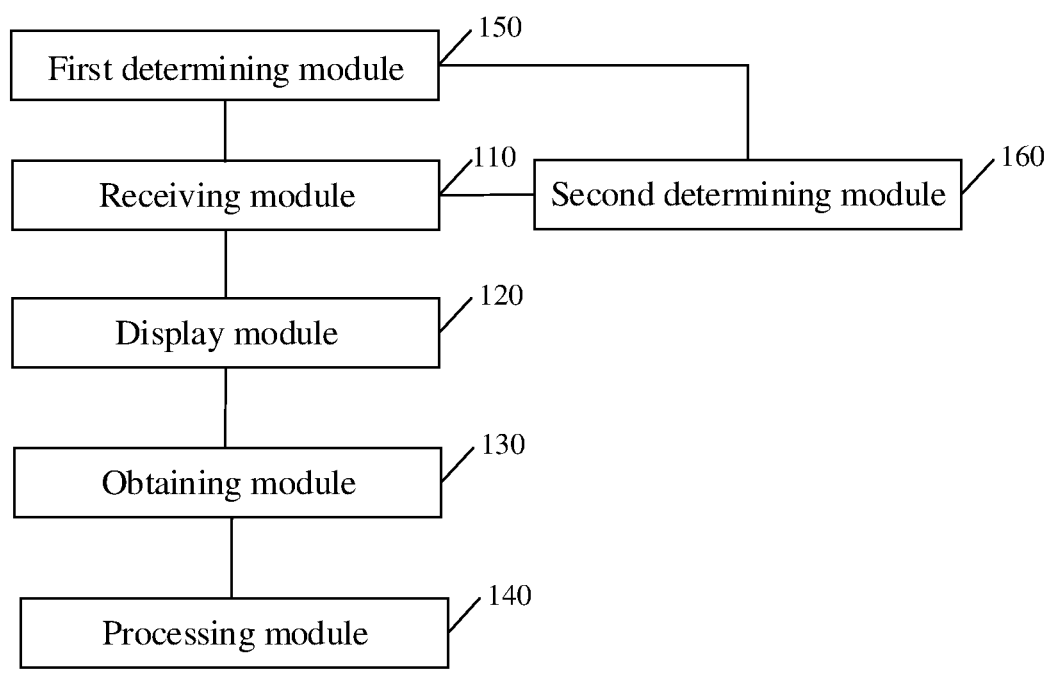
FIG. 7 is a block diagram showing a structure of another document input content processing apparatus according to an embodiment of the present disclosure.

According to an embodiment of the present disclosure, on the basis of the apparatus embodiment illustrated in FIG. 6, the apparatus may further include a first determining module 150 and a display module 120, as illustrated in FIG. 7.

The first determining module 150 is configured to determine whether a network protocol type corresponding to the link address is a predetermined network protocol type.

The display module 120 is specifically configured to display the selection box on the online document page when it is determined that the network protocol type corresponding to the link address is the predetermined network protocol type.

According to an embodiment of the present disclosure, as illustrated in FIG. 7, the apparatus may further include a second determining module 160.

The second determining module 160 is configured to determine whether a link type of the link address is a predetermined link type.

The display module 120 is specifically configured to: display a first selection box on the online document page when it is determined that the link type of the link address is the predetermined link type, in which the first selection box includes a number, N, of non-link display modes, where N is a positive integer greater than 1; and display a second selection box on the online document page when it is determined that the link type of the link address is not the predetermined link type, in which the second selection box includes a number, M, of non-link display modes, where M is a positive integer different from N.

According to an embodiment of the present disclosure, the second determining module 160 is specifically configured to determine whether an address format of the link address conforms to the predetermined address format rule.

It is determined that the link type of the link address is the predetermined link type when it is determined that the address format of the link address conforms to the predetermined address format rule.

Figure 8:
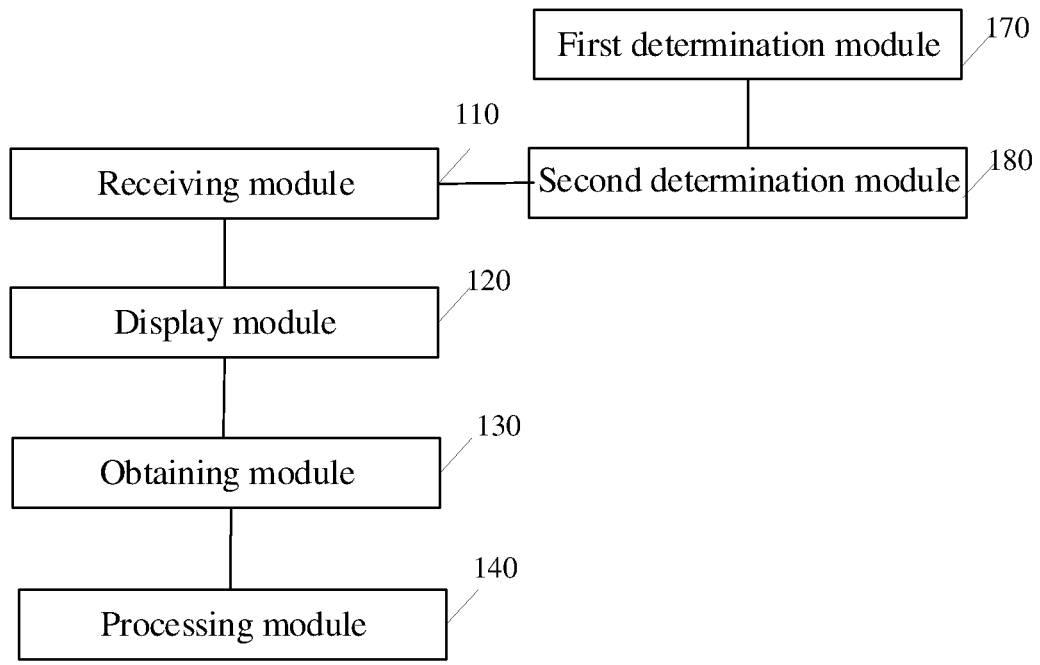
FIG. 8 is a block diagram showing a structure of yet another document input content processing apparatus according to an embodiment of the present disclosure.

According to an embodiment of the present disclosure, on the basis of the apparatus embodiment illustrated in FIG. 6, the apparatus may further include a first determining module 170 and a second determining module 180, as illustrated in FIG. 8.

The first determination module 170 is configured to determine a link type of the link address based on the link address.

The second determination module 180 is configured to determine the at least one non-link display mode in the selection box based on the link type.

According to an embodiment of the present disclosure, when the target display mode is a title display mode, the processing module 140 is specifically configured to obtain, based on the title display mode, title information from the page corresponding to the link address, and display the title information in the document region.

According to an embodiment of the present disclosure, when the target display mode is a web page display mode, the processing module 140 is specifically configured to: obtain, based on the web page display mode, all page content from the page corresponding to the link address; and create a window in the document region, and display a part of all the page content in the created window.

It is to be noted that the above description of the embodiments of the document input content processing method is also applicable to the document input content processing apparatus according to the embodiments, and thus details thereof will not be repeated here.

With the document input content processing apparatus according to the embodiments of the present disclosure, current input content is received in a document region on an online document page. In response to determining that the current input content is a link address, a selection box is displayed on the online document page. In response to determining that a display mode selected by a user from the selection box is a non-link display mode, corresponding content is obtained from a page of the link address, based on the non-link display mode selected by the user. The corresponding content of the page linked with the link address is displayed in the document region. Therefore, the user can view related link content of the link address on the online document page without clicking on the link address on the online document page, thereby reducing operation steps of viewing the link content by the user, facilitating intuitively knowing the link content by a document user, and improving user experience.

To implement the above embodiments, an embodiment of the present disclosure further provides an electronic device. The electronic device includes a memory, a processor, and a computer program stored in the memory and executable by the processor. The processor executes the program to: display, in response to pasting a link address into an online document, a selection box on an online document page, the selection box including at least one non-link display mode; obtain a target display mode selected by a user from the at least one non-link display mode; and obtain, based on the target display mode, corresponding page content from a page corresponding to the link address, and display the corresponding page content in the document region.

Figure 9:
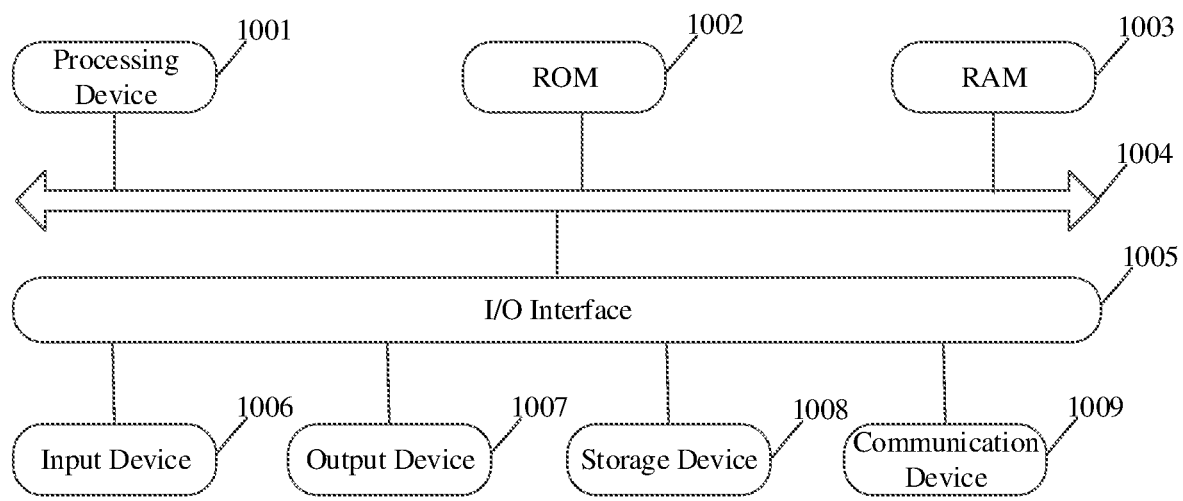
FIG. 9 is a block diagram showing a structure of an electronic device configured to perform a document input content processing method according to an embodiment of the present disclosure.

Reference is now made to FIG. 9, which is a block diagram showing a structure of an electronic device 1000 adapted to implement the embodiments of the present disclosure. The electronic device according to the embodiment of the present disclosure may include, but not limited to, a mobile terminal such as a mobile phone, a laptop computer, a digital broadcast receiver, a Personal Digital Assistant (PDA), a tablet computer, a Portable Multimedia Player (PMP), or a vehicle-mounted terminal (e.g., a vehicle-mounted navigation terminal), or a fixed terminal such as a digital TV, a desktop computer, etc. The electronic device illustrated in FIG. 9 is exemplary only, and should not be construed as limiting the function and scope of use of the embodiments of the present disclosure.

As illustrated in FIG. 9, the electronic device 1000 may include a processing device (such as a central processing unit, a graphics processing unit, etc.) 1001, which may perform various appropriate actions and processes in accordance with programs stored in a Read Only Memory (ROM) 1002 or loaded from a storage device 1008 into a Random Access Memory (RAM) 1003. In the RAM 1003, various programs and data required for operation of the electronic device 1000 may also be stored. The processing device 1001, the ROM 1002, and the RAM 1003 are connected to each other through a bus 1004. An Input/Output (I/O) interface 1005 is also connected to the bus 1004.

Generally, the following devices may be connected to the I/O interface 1005: an input device 1006 including, for example, a touch screen, a touch pad, a keyboard, a mouse, a camera, a microphone, an accelerometer, a gyroscope, etc.; an output device 1007 including, for example, a Liquid Crystal Display (LCD), a speaker, an oscillator, etc.; the storage device 1008 including, for example, a magnetic tape or a hard disk; and a communication device 1009. The communication device 1009 may allow the electronic device 1000 to perform wireless or wired communication with other devices for data exchange. Although FIG. 9 illustrates the electronic device 1000 having various devices, it can be appreciated that it is not necessary to implement or provide all the illustrated devices. Alternatively, more or fewer devices may be implemented or provided.

In particular, according to an embodiment of the present disclosure, the processes described above with reference to the flowcharts may be implemented as computer software programs. For example, an embodiment of the present disclosure includes a computer program product, which includes a computer program carried on a computer-readable medium. The computer program includes program codes for implementing the method illustrated in any of the flowcharts. In these embodiments, the computer program may be downloaded and installed from a network through the communication device 1009, or installed from the storage device 1008, or installed from the ROM 1002. When the computer program is executed by the processing device 1001, the above-mentioned functions defined in the methods according to the embodiments of the present disclosure are performed.

It is to be noted that the above computer-readable medium in the present disclosure may be a computer-readable signal medium or a computer-readable storage medium or any combination thereof. The computer-readable storage medium may be, but not limited to, for example, an electrical, magnetic, optical, electromagnetic, infrared, or semiconductor system, apparatus, or device, or any combination thereof. More specific examples of the computer-readable storage medium may include, but not limited to: an electrical connection having one or more wires, a portable computer disk, a hard disk, a Random Access Memory (RAM), a Read Only Memory (ROM), an Erasable Programmable Read Only Memory (EPROM) or a flash memory, an optical fiber, a Compact Disc Read-Only Memory (CD-ROM), an optical memory device, a magnetic memory device, or any suitable combination thereof. In the present disclosure, the computer-readable storage medium may be any tangible medium including or storing programs, which may be used by or used with an instruction execution system, apparatus, or device. However, in the present disclosure, the computer-readable signal medium may include a data signal propagated in a baseband or as a part of a carrier that carries computer-readable program codes. Such propagated data signal may be in various forms, including but not limited to an electromagnetic signal, an optical signal, or any suitable combination thereof. The computer-readable signal medium may be any computer-readable medium other than the computer-readable storage medium, which may transmit, propagate, or transfer programs used by or used with an instruction execution system, apparatus or device. The program codes stored on the computer-readable medium may be transmitted via any appropriate medium, including but not limited to electric cable, optical cable, Radio Frequency (RF), or any suitable combination thereof.

The above computer-readable medium may be included in the above electronic device; or may be standalone without being assembled into the electronic device.

The above computer-readable medium may carry one or more programs which, when executed by the electronic device, cause the electronic device to: display, in response to pasting a link address into an online document, a selection box on an online document page, the selection box including at least one non-link display mode; obtain a target display mode selected by a user from the at least one non-link display mode; and obtain, based on the target display mode, corresponding page content from a page corresponding to the link address, and display the corresponding page content in the document region.

Alternatively, the above computer-readable medium may carry one or more programs which, when executed by the electronic device, cause the electronic device to: display, in response to pasting a link address into an online document, a selection box on an online document page, the selection box including at least one non-link display mode; obtain a target display mode selected by a user from the at least one non-link display mode; and obtain, based on the target display mode, corresponding page content from a page corresponding to the link address, and display the corresponding page content in the document region.

The computer program codes for implementing the operations according to the embodiments of the present disclosure may be written in one or more programming languages or any combination thereof. The programming languages may include object-oriented programming languages, such as Java, Smalltalk, or C++, as well as conventional procedure-oriented programming languages, such as "C" language or similar programming languages. The program codes may be executed completely on a user computer, partly on the user computer, as a standalone software package, partly on the user computer and partly on a remote computer, or completely on the remote computer or server. In a case where the remote computer is involved, the remote computer may be connected to the user computer through any types of network, including a Local Area Network (LAN) or a Wide Area Network (WAN), or to an external computer (e.g., over the Internet by using an Internet service provider).

The flowcharts and block diagrams in the figures illustrate architectures, functions, and operations of possible implementations of systems, methods, and computer program products according to various embodiments of the present disclosure. In this regard, each block in the flowcharts or block diagrams may represent a module, a program segment, or a part of codes. The module, program segment, or part of codes may contain one or more executable instructions for implementing a specified logical function. It is also to be noted that, in some alternative implementations, functions showed in blocks may occur in a different order from the order shown in the figures. For example, two blocks illustrated in succession may actually be executed substantially in parallel with each other, or sometimes even in a reverse order, depending on functions involved. It is also to be noted that each block in the block diagrams and/or flowcharts, or any combination of the blocks in the block diagrams and/or flowcharts, may be implemented using a dedicated hardware-based system that is configured to perform specified functions or operations or using a combination of dedicated hardware and computer instructions.

What is claimed is:

1. A document input content processing method, comprising:

receiving current input content in a document region on an online document page;

displaying, in response to identifying that the current input content is a link address, a selection box on the online document page, the selection box comprising at least one non-link display mode;

obtaining a target display mode selected by a user from the at least one non-link display mode, the at least one non-link display mode comprising a card link display mode, in which related content of a page linked by the link address is displayed in the document region in a form of a display card; and obtaining, based on the target display mode, corresponding page content from a page corresponding to the link address, and displaying the corresponding page content in the document region, wherein the method comprises, prior to displaying the selection box on the online document page:

determining whether a network protocol type corresponding to the link address is a predetermined network protocol type, the predetermined network protocol type being HTTPS, wherein displaying the selection box on the online document page is performed when it is determined that the network protocol type corresponding to the link address is the predetermined network protocol type, and wherein no processing will be performed on the link address pasted to the online document page, and only the link address is displayed, when it is determined that the network protocol type corresponding to the link address is not the predetermined network protocol type.

2. The method according to claim 1, further comprising, prior to displaying the selection box on the online document page:

determining whether a link type of the link address is a predetermined link type, wherein displaying the selection box on the online document page comprises:

displaying a first selection box on the online document page when it is determined that the link type of the link address is the predetermined link type, wherein the first selection box comprises a number, N, of non-link display modes, where N is a positive integer greater than 1; and displaying a second selection box on the online document page when it is determined that the link type of the link address is not the predetermined link type, wherein the second selection box comprises a number, M, of non-link display modes, where M is a positive integer different from N.

3. The method according to claim 2, wherein determining whether the link type of the link address is the predetermined link type comprises:

obtaining a predetermined address format rule corresponding to the predetermined link type; and determining whether an address format of the link address conforms to the predetermined address format rule, and wherein it is determined that the link type of the link address is the predetermined link type when it is determined that the address format of the link address conforms to the predetermined address format rule.

4. The method according to claim 1, further comprising, prior to displaying the selection box on the online document page:

determining a link type of the link address based on the link address; and determining the at least one non-link display mode in the selection box based on the link type.

5. The method according to claim 1, wherein when the target display mode is a title display mode, obtaining, based on the target display mode, the corresponding page content from the page corresponding to the link address, and displaying the corresponding page content in the document region comprise:

obtaining, based on the title display mode, title information from the page corresponding to the link address, and displaying the title information in the document region.

6. The method according to claim 1, wherein when the target display mode is a web page display mode, obtaining, based on the target display mode, the corresponding page content from the page corresponding to the link address, and displaying the corresponding page content in the document region comprise:

obtaining, based on the web page display mode, all page content from the page corresponding to the link address; and creating a window in the document region, and displaying a part of all the page content in the created window.

7. A document input content processing apparatus, comprising:

at least one processor; and memory storing instructions that, when executed by the at least one processor, cause the at least one processor to implement:

a receiving module configured to receive current input content in a document region on an online document page;

a display module configured to display, in response to identifying that the current input content is a link address, a selection box on the online document page, the selection box comprising at least one non-link display mode, the at least one non-link display mode comprising a card link display mode, in which related content of a page linked by the link address is displayed in the document region in a form of a display card;

an obtaining module configured to obtain a target display mode selected by a user from the at least one non-link display mode;

a processing module configured to obtain, based on the target display mode, corresponding page content from a page corresponding to the link address, and display the corresponding page content in the document region; and a second determining module configured to determine whether a network protocol type corresponding to the link address is a predetermined network protocol type, the predetermined network protocol type being HTTPS;

wherein the display module is further configured to display the selection box on the online document page when it is determined that the network protocol type corresponding to the link address is the predetermined network protocol type, and wherein the display module is further configured to perform no processing on the link address pasted to the online document page, and only display the link address, when it is determined that the network protocol type corresponding to the link address is not the predetermined network protocol type.

8. An electronic device, comprising:

at least one processor; and a memory communicatively connected to the at least one processor, wherein the memory stores instructions executable by the at least one processor, and the instructions are configured to:

receive current input content in a document region on an online document page;

display, in response to identifying that the current input content is a link address, a selection box on the online document page, the selection box comprising at least one non-link display mode;

obtain a target display mode selected by a user from the at least one non-link display mode, the at least one non-link display mode comprising a card link display mode, in which related content of a page linked by the link address is displayed in the document region in a form of a display card; and obtain, based on the target display mode, corresponding page content from a page corresponding to the link address, and displaying the corresponding page content in the document region, wherein the instructions are further configured to, prior to displaying the selection box on the online document page:

determine whether a network protocol type corresponding to the link address is a predetermined network protocol type, the predetermined network protocol type being HTTPS, display the selection box on the online document page when it is determined that the network protocol type corresponding to the link address is the predetermined network protocol type, perform no processing on the link address pasted to the online document page, and display only the link address, when it is determined that the network protocol type corresponding to the link address is not the predetermined network protocol type.

9. The electronic device according to claim 8, further comprising instructions that when executed by the processor cause the electronic device to, prior to said displaying the selection box on the online document page:

determine whether a link type of the link address is a predetermined link type, wherein displaying the selection box on the online document page comprises:

displaying a first selection box on the online document page when it is determined that the link type of the link address is the predetermined link type, wherein the first selection box comprises a number, N, of non-link display modes, where N is a positive integer greater than 1; and displaying a second selection box on the online document page when it is determined that the link type of the link address is not the predetermined link type, wherein the second selection box comprises a number, M, of non-link display modes, where M is a positive integer different from N.

10. The electronic device according to claim 9, wherein determining whether the link type of the link address is the predetermined link type comprises:

obtaining a predetermined address format rule corresponding to the predetermined link type; and determining whether an address format of the link address conforms to the predetermined address format rule, and wherein it is determined that the link type of the link address is the predetermined link type when it is determined that the address format of the link address conforms to the predetermined address format rule.

11. The electronic device according to claim 8, further comprising instructions that when executed by the processor cause the electronic device to, prior to said displaying the selection box on the online document page:

determine a link type of the link address based on the link address; and determine the at least one non-link display mode in the selection box based on the link type.

12. The electronic device according to claim 8, wherein when the target display mode is a title display mode, obtaining, based on the target display mode, the corresponding page content from the page corresponding to the link address, and displaying the corresponding page content in the document region comprise:

obtaining, based on the title display mode, title information from the page corresponding to the link address, and displaying the title information in the document region.

13. The electronic device according to claim 8, wherein when the target display mode is a web page display mode, obtaining, based on the target display mode, the corresponding page content from the page corresponding to the link address, and displaying the corresponding page content in the document region comprise:

obtaining, based on the web page display mode, all page content from the page corresponding to the link address; and creating a window in the document region, and displaying a part of all the page content in the created window.

14. A non-transitory computer-readable storage medium, storing computer instructions configured to cause a computer to perform operations comprising:

receiving current input content in a document region on an online document page;

displaying, in response to identifying that the current input content is a link address, a selection box on the online document page, the selection box comprising at least one non-link display mode, the at least one non-link display mode comprising a card link display mode, in which related content of a page linked by the link address is displayed in the document region in a form of a display card;

obtaining a target display mode selected by a user from the at least one non-link display mode; and obtaining, based on the target display mode, corresponding page content from a page corresponding to the link address, and displaying the corresponding page content in the document region;

wherein the operations further comprise, prior to displaying the selection box on the online document page;

determining whether a network protocol type corresponding to the link address is a predetermined network protocol type, the predetermined network protocol type being HTTPS, wherein displaying the selection box on the online document page is performed when it is determined that the network protocol type corresponding to the link address is the predetermined network protocol type, wherein no processing will be performed on the link address pasted to the online document page, and only the link address is displayed, when it is determined that the network protocol type corresponding to the link address is not the predetermined network protocol type.

* * * * *